R. M. DIXON.
PRESSURE GAGE.
APPLICATION FILED FEB. 29, 1908.

1,032,384.

Patented July 16, 1912.

WITNESSES:
H. C. Lummis.
Paul Woolf.

INVENTOR
R. M. Dixon
BY
ATTORNEYS

UNITED STATES PATENT OFFICE.

ROBERT M. DIXON, OF EAST ORANGE, NEW JERSEY, ASSIGNOR TO THE SAFETY CAR HEATING & LIGHTING COMPANY, A CORPORATION OF NEW JERSEY.

PRESSURE-GAGE.

1,032,384.  Specification of Letters Patent.  Patented July 16, 1912.

Application filed February 29, 1908. Serial No. 418,439.

*To all whom it may concern:*

Be it known that I, ROBERT M. DIXON, a citizen of the United States, residing at East Orange, in the county of Essex and State of New Jersey, have invented certain new and useful Improvements in Pressure-Gages, of which the following is a full, clear, and exact description, such as will enable others skilled in the art to which it appertains to make and use the same.

This invention relates to gages, and more particularly to those of the fluid pressure type.

The prime object of the present invention is to provide a gage that will accurately measure the quantity of a fluid under pressure irrespective of its temperature.

Another object hereof is to provide a gage of the Bourdon tube type with a thermostatic regulating device, whereby the extensile or retractile movements of the Bourdon tube and the effects of such movements upon the pressure indicating means will be varied to compensate for changes in the temperatures of the fluid under pressure.

A further object is to provide a fluid pressure gage of the above type which is especially adapted for use in gas utilizing systems of railway cars.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claim.

Figure 2:
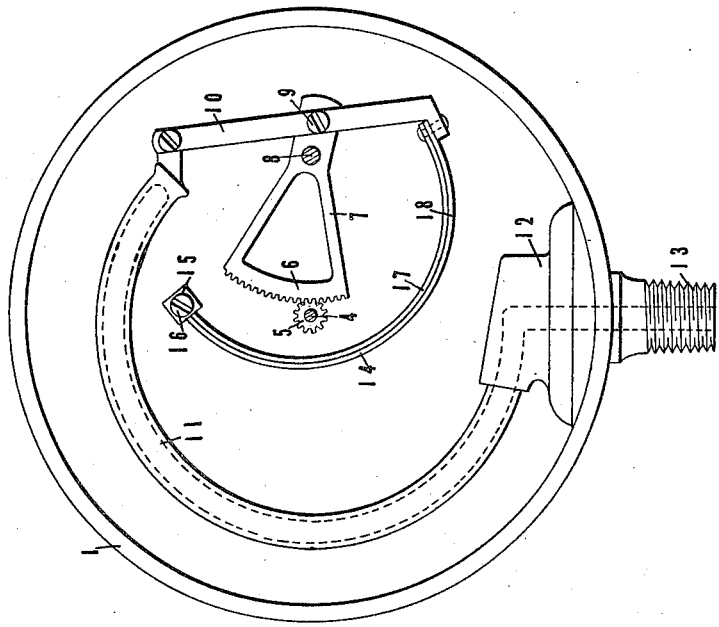
Figure 1:
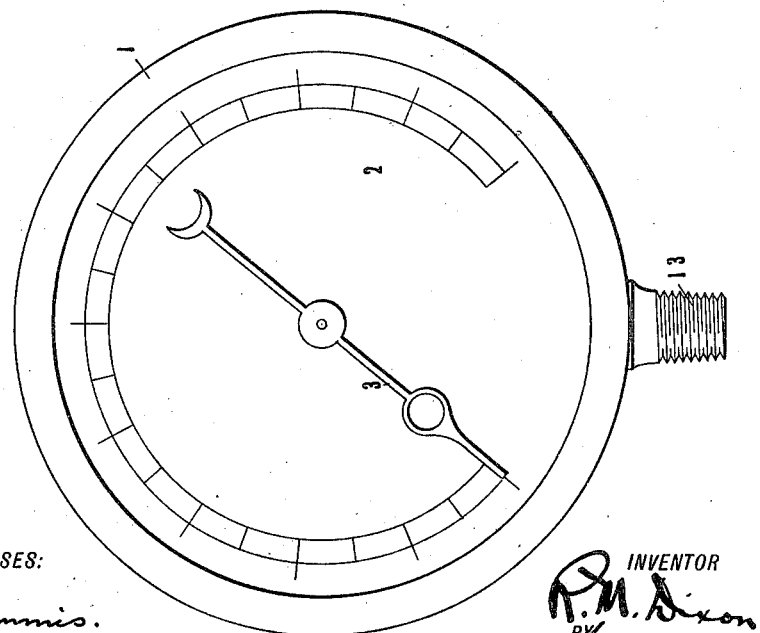

In the accompanying drawing, wherein is illustrated one of the various possible embodiments of my invention, Figure 1 is a view in elevation of a fluid pressure gage showing the dial and indicator. Fig. 2 is a similar view with the dial removed so as to disclose the operative mechanism.

Similar reference characters refer to similar parts in both figures of the drawing.

Referring now to the drawings, 1 indicates the casing of a pressure gage of the single Bourdon spring tube type, said casing being provided with a dial 2, with which coöperates an indicator pointer 3, the stem 4 of which, in the present instance, is swiveled centrally of the casing. Stem 4 of the pointer 3 is, in the present instance, provided with a pinion 5 with which meshes a segmental rack 6 provided upon a lever 7 swiveled upon a stud 8 fixed within the casing.

The outer end of lever 7, in the present instance, is pivotally connected at 9 with a lever 10, one end of which is pivotally attached to the free end of the Bourdon tube 11. The opposite end of tube 11 is supported in a bracket 12 within the casing of the gage and said tube communicates with a nipple 13, which is adapted to be connected with the container for the fluid.

The end of the lever 10 opposite to that which is connected to the Bourdon tube, has secured thereto, in the present instance, the free end of the thermostatic member 14, the opposite end of which is firmly secured to the back wall of the gage as by means of a block 15 and clamp screw 16. This thermostatic member, in the present instance, is made up of two strips of metal, having different coefficients of expansion, as brass and iron. In the present embodiment the inner member 17 is made of brass, and the outer 18 of iron, and it is evident that as the temperature increases the brass strip will tend to expand more than the iron, thus giving the thermostatic member a tendency to straighten and causing it to act in opposition to the spring tube. Vice versa, a decrease in the temperature will cause such relative contraction between the brass and iron strips as will exert a stress in an opposite direction, thus aiding the spring tube in any movement toward extension.

Having thus described the construction of this embodiment of my invention, the operation thereof may now be understood. At this point it may be noted, that the mechanism of the gage is initially adjusted in such manner that the quantity of gas at a given temperature in a container will be accurately indicated by the movable pointer upon the dial. With the parts in this adjustment the gage will continue accurately to indicate the quantity of gas in the container, so long as the temperature thereof is not changed. When, however, a rise or fall in the temperature of the gas within the container obtains the expansion or contraction of the thermostatic member, through its connection with the Bourdon tube and the lever which is connected with the movable indicator, will so vary the tendency toward con- traction or extension of the Bourdon tube that the operation of the indicating means will be varied to exactly compensate for the changes in the temperature of the gas within the container.

It will accordingly be seen that I have provided a construction well adapted to attain, among others, the several aims and advantages of my invention in a simple, yet efficient, manner. One of the several advantages inherent in the present construction is that when the same is used in connection with gas tanks employed in railway cars which are subjected to various changes in temperature, the quantity of gas in the tanks of the cars, will at all times be accurately measured by its pressure, without regard to the climatic changes to which the car may be exposed.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claim is intended to cover all of the generic and specific features of the invention herein described and all statements of the scope of the invention, which, as a matter of language, might be said to fall therebetween.

Having described my invention, what I claim as new and desire to secure by Letters Patent, is:—

In a device of the class described, in combination, a scale, a movable member coacting with said scale, a member subjected to fluid pressure and adapted to change form as said pressure varies, an operative connection between said members, and a thermostatic device operatively related to said first member and so formed and proportioned as to tend to affect the indication of said member upon said scale substantially in inverse proportion to changes in the absolute temperature of said fluid, whereby changes in pressure due to changes in temperature of said fluid are neutralized.

In testimony whereof I affix my signature, in the presence of two witnesses.

ROBERT M. DIXON.

Witnesses:
   GEORGE E. HULSE,
   ELMER E. ALLBER.